United States Patent [19]

Chambers

[11] 4,287,627
[45] Sep. 8, 1981

[54] METHOD AND MEANS FOR THREADING DOWELS

[76] Inventor: Bruce J. Chambers, 437-26th St. S.E., Cedar Rapids, Iowa 52403

[21] Appl. No.: 131,700

[22] Filed: Mar. 19, 1980

[51] Int. Cl.³ ............................................... B23G 1/00
[52] U.S. Cl. ...................................... 10/88; 144/2 R; 144/136 C; 409/76; 409/172
[58] Field of Search ............... 10/88, 94, 89; 144/2 R, 144/134 R, 134 D, 136 C, 323; 409/73, 76, 172, 65

[56] References Cited

U.S. PATENT DOCUMENTS

| 167,988 | 9/1875 | Chamberlin et al. | 10/88 |
| 3,946,774 | 3/1976 | McCord, Jr. | 409/65 |

Primary Examiner—W. D. Bray
Attorney, Agent, or Firm—Zarley, McKee, Thomte, Voorhees & Sease

[57] ABSTRACT

A dowel threading device comprised of a conventional router having a horizontal base, a power means on the base, and a vertically disposed cutting bit extending downwardly and outwardly from the base. A dowel threading attachment is secured underneath the base and has a vertically disposed bore adapted to receive the lower end of the cutting bit. A horizontal bore extends through said base member and is in communication with the vertically disposed bore. The horizontal bore is threaded at one side of the vertically disposed bore. The method of this invention comprises inserting a dowel into the end of the unthreaded horizontal bore, rotating the dowel about its horizontal axis as the dowel moves into contact with the rotating cutting bit, and engaging the threaded end of the dowel with the threaded portion of the horizontal bore so that the further longitudinal movement of the dowel through the bore will be controlled by the engagement of the dowel with the threaded portion of the horizontal bore.

6 Claims, 6 Drawing Figures

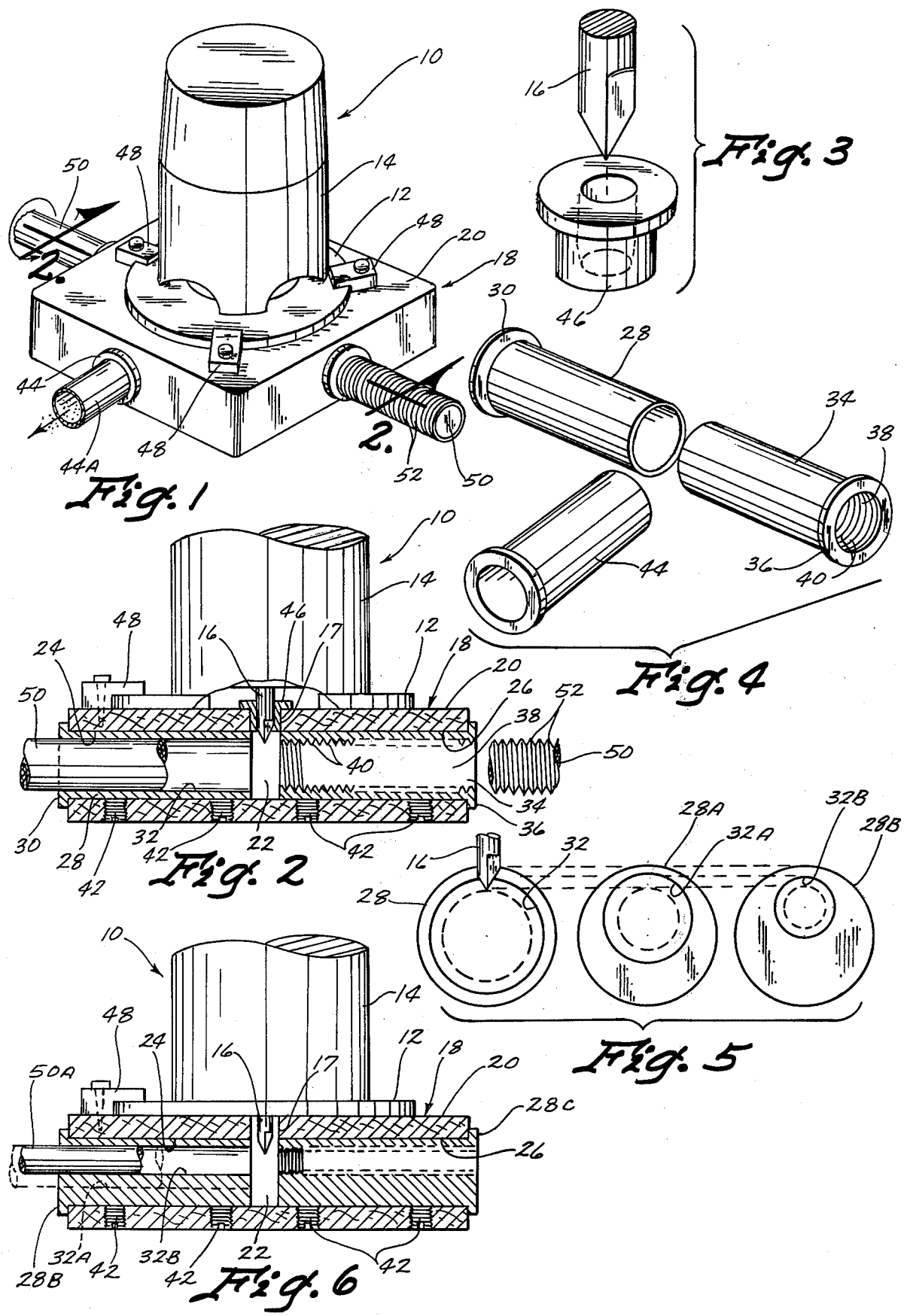

METHOD AND MEANS FOR THREADING DOWELS

BACKGROUND OF THE INVENTION

Special machines have been devised to cut threads in wooden dowels and the like. These machines are very expensive and are not easily adaptable to threading dowels of varying diameters. These machines of the prior art are normally prohibitive in cost to many home craftsmen who otherwise have a need for threaded dowels.

SUMMARY OF THE INVENTION

This invention contemplates the combination of a conventional router with a dowel threading attachment whereby the conventional router can effect the threading of a dowel, and then can be removed to perform other normal use to which a router is placed.

It is a further object of this invention to provide an attachment for a router which is inexpensive and which can permit the threading of dowels of various diameters.

The dowel threading attachment is comprised of a base member with a bore extending therethrough in a horizontal direction. The horizontal bore is intersected by a vertical bore which is adapted to receive the conventional cutting bit of the router. The horizontal bore is threaded at one side of the cutting bit. The dowel stock is inserted into the unthreaded end of the horizontal bore and is simultaneously fed inwardly and rotated about its longitudinal axis. As the cutting bit forms a thread therein, the then threaded end of the dowel becomes threadably engaged in the threaded portion of the horizontal bore. This threaded engagement then controls the further longitudinal movement of the dowel through the bore. The cutting bit must be adjusted to a level compatible with the threads in the threaded portion of the bore so that the threads formed in the dowel will be compatible with the threaded bore.

A BRIEF DESCRIPTION OF THE DRAWINGS

FIG. 1 is a perspective view of the device of this invention;

FIG. 2 is a partial sectional view taken on line 2—2 of FIG. 1;

FIG. 3 is an exploded perspective view of the cutting bit and the centering bushing;

FIG. 4 is an exploded view of the sleeves that are inserted into the base member of the dowel attachment;

FIG. 5 is an exploded end elevational view of different sleeves that can be used in the dowel attachment; and FIG. 6 is a sectional view similar to that of FIG. 2 but with an alternate dowel sleeve placed in the dowel attachment to accommodate a dowel of a smaller diameter.

DESCRIPTION OF THE PREFERRED EMBODIMENT

A conventional router 10 is comprised of a base 12, and a motor and motor housing 14 extend upwardly therefrom. A cutting bit 16 is operatively connected to the router motor and extends downwardly through a conventional center aperture 17 in the base 12.

A dowel attachment 18 is comprised of a base member 20 which has a vertical aperture 22. Aperture 22 registers with and comprises an extension of the center aperture 17 in the router base 12.

A horizontal aperture 24 extends from one side of base member 20 inwardly toward the aperture 22. Horizontal aperture 26 is longitudinally aligned with aperture 24 and also is in communication with aperture 22.

A hollow sleeve 28 with an outer flange 30 and an inner smooth bore 32 is slidably insertable into the horizontal aperture 24. Similarly, hollow sleeve 34 with outer flange 36 and bore 38 is slidably insertable into the horizontal aperture 26. The bore 38 has at least a part of its inner portion imposed with threads 40 which are of the size to be imposed upon the dowel to be threaded. Allen screws 42 extend upwardly through a bottom of base member 20 to selectively hold the hollow sleeves 28 and 34 within their respective bores.

A further sleeve 44 extends inwardly through a suitable bore (not shown) and into communication with vertical bore 22 to serve as a conduit for the residue material from the dowel cutting operation to move from the vertical aperture 22.

To properly place the router 10 on the base member 20, a centering bushing 46 is placed within the aperture 17, and then the conventional clamps 48 are actuated to secure the base 12 of the router to the base member 20 of the dowel attachment. The bushing 46 is removed from the device before the dowel cutting operation begins.

With reference to FIG. 5, hollow sleeves 28A and 28B are shown. These two sleeves have smooth bores 32A and 32B, respectively. It is noted that the bores 32A and 32B are not concentrically located within these two sleeves for they are adapted to accommodate dowels of a smaller diameter than the dowels which would be used in sleeve 28. Hollow sleeve 28C shown in FIG. 6 has its inner bore threaded and is adapted to be used with sleeve 28B. Relation of sleeves 28B and 28C is the same as the relation between sleeves 28 and 34 except for the location of the bores therein.

A large diameter 50 is shown in FIGS. 1 and 2. The numeral 52 designated threads formed in dowel 50. A dowel 50A of a smaller diameter is shown in FIG. 6.

The normal operation of the device of this invention and the method of this invention are comprised of inserting the dowel 50 into the smooth bore 32 of sleeve 28 with the cutting bit 16 being powered and rotating about its own vertical axis. The heighth of the cutting blade 16 must be set so that it corresponds with the level of the threads 40 in sleeve 54. The dowel 50 is rotated about its own axis as it comes into contact with bit 16. The bit thereupon commences to cut an initial thread in the end of the dowel 50, and this initial thread then engages the initial thread 40 in sleeve 34. The engagement of the threaded end of the dowel with the threads 40 then permits the threads 40 to control the further inward longitudinal movement of the dowel through the device. The threads being cut in the dowel will thereupon be compatible with the threads 40 in sleeve 34.

Any of the sleeves shown in FIG. 5 can be selectively inserted into the dowel attachment 18 through the use of allen screws 42 so that dowels of different diameters can be threaded. Different dowels may require an adjustment between the heighth of cutting bit 16 and the bore of the sleeve, and this can be achieved through the location of the bore in the sleeve. The bore can be located with respect to the bit to create threads of desired depth.

As previously indicated, the release of the clamps 48 will permit the router 10 to be removed from the dowel attachment so that the router can be used for its other normal purposes.

Residue from the dowel threading operation accumulating in aperture 22 is permitted to exit the unit through the sleeve 44 and any extension, such as tube 44A which is secured thereto.

It is, therefore, seen that the device and method of this invention will achieve at least their stated objectives.

I claim:

1. A dowel threading device, comprising the combination of a router having a horizontal base, a power means on said base, and a vertically disposed sharp cutting bit connected to said power means and with a lower end thereof protruding through an aperature in said base, and a dowel threading attachment, comprising, a base member detachably secured underneath the base of said router, said base member having a vertically disposed bore adapted to receive the lower end of said cutting bit, first and second longitudinally aligned horizontal bores extending inwardly into said base member and communicating with said vertically disposed bore, said first bore being of uniform diameter and being adapted to receive an elongated dowel having an outer diameter substantially the same as the inner diameter of said bore, said second bore having a diameter slightly less than the diameter of said first bore, with threads being imposed in said second bore, said cutting bit having its lower end terminating at the level of said threads so that a rotating dowel having threads imposed therein by said cutting bit can be threadably received by said threads in said second bore.

2. The device of claim 1 wherein said first and second bores are comprised of hollow sleeves that are inserted into longitudinally aligned aperatures in said bore member.

3. The device of claim 2 wherein said bores are not concentric with said aperatures.

4. The device of claim 1 wherein a threaded bore extends inwardly into said base member and into communication with said vertically disposed bore to permit residue from the threading of a dowel to move from said base member.

5. The method of threading a dowel, comprising, providing a base member with a bore extending therethrough wherein a portion of said bore is smooth and a portion thereof is threaded, protruding a thread cutting bit partially into said bore adjacent said smooth and threaded portions thereof so that said bit will terminate at the level of said threaded portion, longitudinally inserting a dowel having an outer diameter substantially the same as the inner diameter of said smooth bore into said smooth bore, rotating said dowel about its longitudinal axis into engagement with said cutting bit and rotating said cutting bit to impose threads in said dowel, and threadably engaging said dowel in the threaded portion of said bore whereby the further longitudinal movement of said dowel through said bore will be controlled by the engagement of said dowel in the threaded portion of said bore.

6. A dowel threading device, comprising the combination of a power means, a vertically disposed sharp cutting bit connected to said power means, and a dowel threading attachment, comprising, a base member detachably secured underneath said power means, said base member having a vertically disposed bore adapted to receive the lower end of said cutting bit, first and second longitudinally aligned horizontal bores extending inwardly into said base member and communicating with said vertically disposed bore, said first bore being of uniform diameter and being adapted to receive an elongated dowel having an outer diameter substantially the same as the inner diameter of said bore, said second bore having a diameter slightly less than the diameter of said first bore, with threads being imposed in said second bore, said cutting bit having its lower end terminating at the level of said threads so that a rotating dowel having threads imposed therein by said cutting bit can be threadably received by said threads in said second bore.

* * * * *